(12) United States Patent
Dutta

(10) Patent No.: US 10,200,571 B2
(45) Date of Patent: Feb. 5, 2019

(54) DISPLAYING AN ADJUSTED IMAGE ACCORDING TO AMBIENT LIGHT CONDITIONS

(71) Applicant: Nvidia Corporation, Santa Clara, CA (US)

(72) Inventor: Santanu Dutta, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 15/147,703

(22) Filed: May 5, 2016

(65) Prior Publication Data

US 2017/0324940 A1 Nov. 9, 2017

(51) Int. Cl.
*H04N 1/60* (2006.01)
*H04N 9/73* (2006.01)

(52) U.S. Cl.
CPC ......... *H04N 1/6086* (2013.01); *H04N 1/6088* (2013.01); *H04N 9/73* (2013.01)

(58) Field of Classification Search
CPC .. H04N 9/77; H04N 9/74; H04N 9/69; H04N 5/23229; H04N 5/23216; H04N 1/6083; H04N 1/6086; H04N 1/6088; H04N 9/73
See application file for complete search history.

(56) References Cited

U.S. PATENT DOCUMENTS

| | | | | |
|---|---|---|---|---|
| 6,067,624 A * | 5/2000 | Kuno | .................... | H04N 5/232 348/E5.042 |
| 6,133,941 A * | 10/2000 | Ono | .................... | H04N 5/23206 348/14.05 |
| 6,373,531 B1 * | 4/2002 | Hidaka | .................... | G01J 1/4204 348/602 |
| 6,980,231 B1 * | 12/2005 | Ohsawa | ............... | H04N 1/6055 348/179 |
| 7,265,781 B2 * | 9/2007 | Noguchi | ................ | H04N 9/735 348/188 |
| 8,386,536 B2 | 2/2013 | Gotou | | |
| 8,570,438 B2 | 10/2013 | Bhaskaran et al. | | |
| 8,797,441 B2 * | 8/2014 | Patel | ........................ | H04N 5/20 348/333.01 |
| 9,332,233 B2 * | 5/2016 | Yanagidate | ........ | H04N 1/33307 |
| 9,501,817 B2 | 11/2016 | Atkins et al. | | |
| 2003/0016289 A1 * | 1/2003 | Motomura | ............... | H04N 1/46 348/211.5 |
| 2004/0119841 A1 * | 6/2004 | Shimizu | ............. | H04N 1/00413 348/222.1 |

(Continued)

OTHER PUBLICATIONS

Wolfcrow website (www.wolfcrow.com), titled "What is display gamma and gamma correction?", by Sareesh Sudhakaran, pp. 1-7, published Mar. 5, 2016.*

*Primary Examiner* — Twyler Haskins
*Assistant Examiner* — Akshay Trehan

(57) ABSTRACT

An image of an object under a first illuminant is captured. The color of the ambient light at a device on which the image is to be displayed is identified. The image data is adjusted to compensate for the color of the ambient light as well as for the color of the first illuminant. An image based on the adjusted image data can then be displayed on the device. As such, the desired perception of the colors in the displayed image can be managed so that image quality is maintained even if the image is displayed under different ambient lighting conditions.

17 Claims, 6 Drawing Sheets

(56) References Cited

U.S. PATENT DOCUMENTS

| | | | | |
|---|---|---|---|---|
| 2007/0165048 | A1* | 7/2007 | Yamashita | G06T 5/009 |
| | | | | 345/601 |
| 2011/0122290 | A1* | 5/2011 | Eun | H04N 1/00347 |
| | | | | 348/231.1 |
| 2011/0305391 | A1 | 12/2011 | Kunkel et al. | |
| 2012/0321273 | A1 | 12/2012 | Messmer | |
| 2013/0342761 | A1* | 12/2013 | Wada | H04N 5/38 |
| | | | | 348/571 |
| 2014/0063284 | A1* | 3/2014 | Yanagidate | H04N 7/185 |
| | | | | 348/223.1 |
| 2015/0215563 | A1* | 7/2015 | Yanagidate | H04N 5/23206 |
| | | | | 348/500 |
| 2015/0288868 | A1* | 10/2015 | Slavin | H04N 7/181 |
| | | | | 348/159 |
| 2016/0323518 | A1* | 11/2016 | Rivard | H04N 5/247 |

* cited by examiner

DISPLAYING AN ADJUSTED IMAGE ACCORDING TO AMBIENT LIGHT CONDITIONS

BACKGROUND

Chromatic adaptation allows humans to interpret a color within the context of its surroundings. For example, an object such as a red apple may be viewed under different lighting conditions such as sunlight or different colors of artificial light. Even though the illuminant may be different in each situation, the human visual system will indicate that the object has about the same color—the apple will still appear to be red or at least a shade of red.

In situations where color interpretation is carried out by machines, such as when an image is scanned by a scanner and printed by a printer, automatic chromatic adaptation is not performed as in the human visual system. For example, the scanning may take place under a fluorescent light (which contains a lot of bluish light) but the printed image may be viewed under sunlight (which contains a lot of yellow light). Because of the difference in illuminants, chromatic adaptation between the source (the scanner) and the destination (the printer) is needed in order to convey the correct colors into the printed image.

The human visual system perceives the colors in an image or video based on the color of the illuminant at the source (the color of the light under which the image was captured) as well as the color of the light at the destination (the color of the ambient light where the image or video is being viewed). For example, a mobile device may be carried from room to room, with each room illuminated by different types/colors of lights: one room may be lit with artificial incandescent light, the next room with daylight, and another room with artificial mercury-based neon light (a bluish light). Under these conditions, the same image on the device's screen will look different in each room of the various rooms. Thus, while a human may perceive an apple as being red even when viewed under different color lighting conditions because of chromatic adaptation, when an image of a red apple in sunlight is viewed under artificial incandescent light, the apple may not appear to be red or at least may not appear to be the same color of red that would be perceived if the image was instead viewed under the same lighting conditions in which the picture was taken (that is, in sunlight).

SUMMARY

In embodiments according to the present disclosure, the color of the light at the destination (e.g., the ambient light in the environment in which an image is to be viewed) is sensed, and an image is processed so that the quality of the image is maintained under different ambient lighting conditions. The processing can be performed on, for example, a mobile device, so that as the device is moved from one location to another, the image is changed so that it continues to look good even if the locations have different colors of lights. Specifically, the colors of objects in the original image can be maintained even when viewed under different ambient light conditions. For example, a red object captured in a picture taken in sunlight can be processed so that the same shade of red is seen when the object is displayed under a different color or type of light.

More specifically, in an embodiment, a color of ambient light at a device is identified (e.g., sensed). Image data for an image of an object is accessed. The image data is adjusted according to the color of the ambient light to generate adjusted image data that compensates for the color of the ambient light. An image that is based on the adjusted image data can then be displayed on the device.

More specifically, in an embodiment, the image processing includes inverse-gamma-encoding gamma-domain non-linear image data for an image to produce inverse-gamma-domain linear image data. The inverse-gamma-domain linear image data is converted into a device-independent version of the image data. The device-independent version of the image data is adjusted to compensate for a color of the illuminant at the source (the illuminant under which the image data was captured) and to compensate for the color of the ambient light at the destination (the illuminant under which the image is to be viewed), to produce the adjusted image data. The adjusted image data is converted into device-dependent image data, which is gamma-encoded to generate a version of the image data that can be displayed on the device.

In an embodiment, the color of the ambient light is sensed with a sensor coupled to the device. The sensor may be a camera. That sensor, or a second sensor, can be used to also sense the brightness of the ambient light (or some other characteristic of the ambient light), in which case the image data can also be adjusted according to that brightness (or other characteristic).

In an embodiment, a user selects a second color and the image data is adjusted according to the second color. An image that is based on the adjusted image data can then be displayed on the device. In this manner, the user can change the image based on his or her tastes or for artistic reasons, for example.

Thus, embodiments according to the present disclosure sense the color of ambient light and perform image processing to compensate for the color of the ambient light in the displayed image. In other embodiments, the displayed image is adjusted according to a user's color selection. Consequently, image quality can be improved and maintained under different viewing conditions (e.g., different ambient lighting conditions). The image processing can be performed dynamically on a mobile device, for example, so that image quality is maintained when ambient lighting conditions change (because the lighting conditions at the device's location change over time or because the device is being moved among different locations that have different lighting conditions).

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1A:
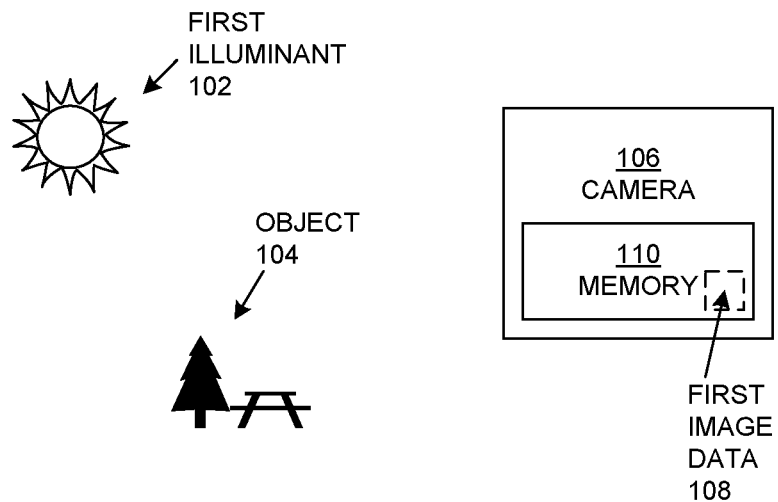
FIG. 1A is a block diagram illustrating a camera capturing an image under a first (source) illuminant in an embodiment according to the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "displaying," "accessing," "adjusting," "sensing," "converting," "gamma-encoding," "generating," "inverse-gamma-encoding," "transforming," or the like, refer to actions and processes (e.g., the flowcharts 400 and 500 of FIGS. 4 and 5, respectively) of a computing system or similar electronic computing device or processor (e.g., the device 600 of FIG. 6). The computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1A illustrates a camera 106 that captures an image of an object 104 under a first illuminant 102, which may also be referred to as the source illuminant. The image of the object 104 is recorded as image data 108 in a memory 110 of the camera 106. The image data 108 may be referred to herein as first image data.

Figure 1B:
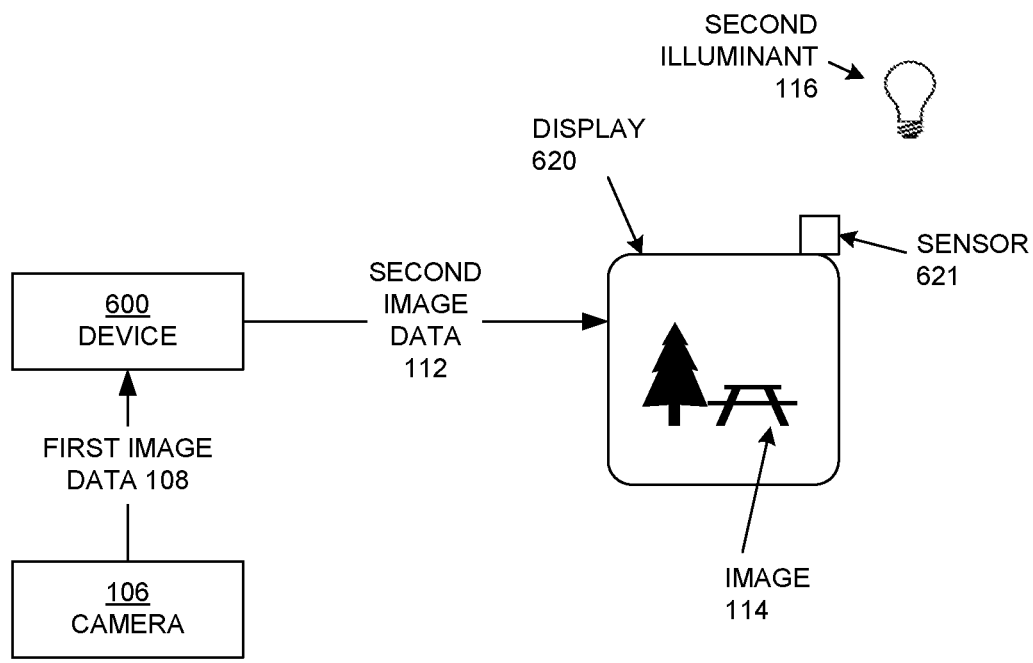
FIG. 1B is a block diagram illustrating a device that displays the image under a second (destination, ambient) illuminant in an embodiment according to the present invention.
Figure 6:
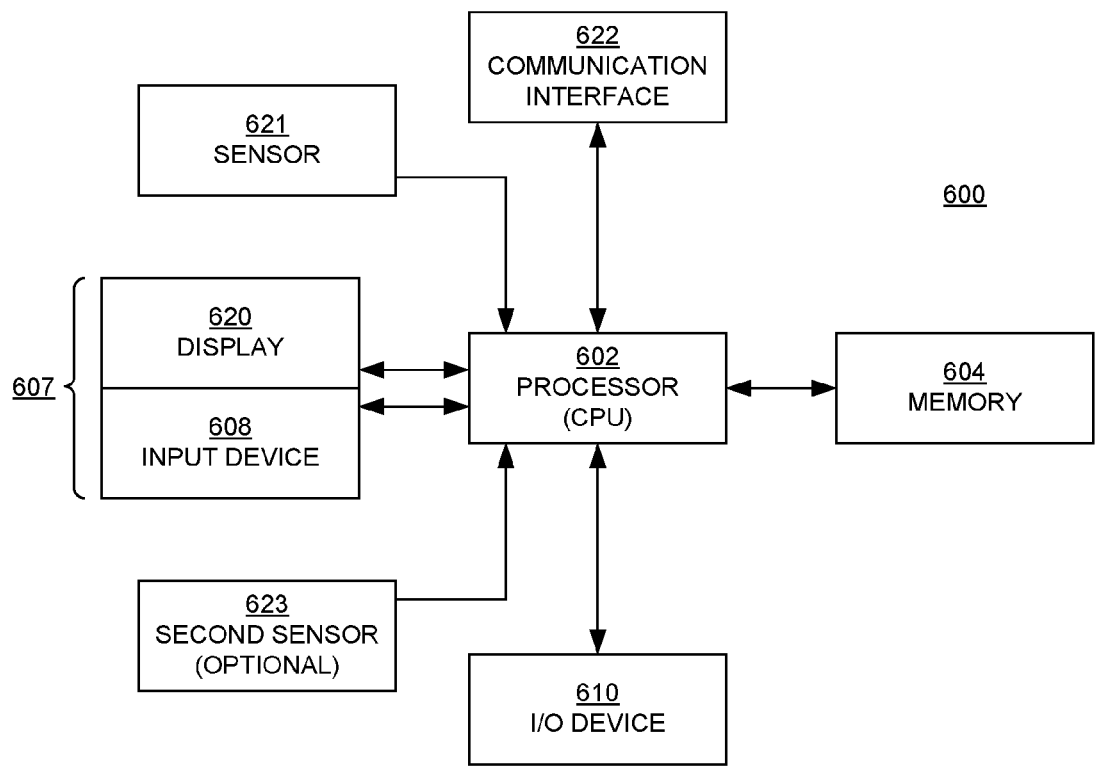
FIG. 6 is a block diagram illustrating an example of a device upon which embodiments according to the present invention can be implemented.

In FIG. 1B, the image data 108 is transferred to and stored on a device 600 (e.g., a mobile device; see FIG. 6). The camera 106 of FIG. 1A may be a component of the device 600, or the camera may be another device or part of another device, in which case the image data 108 can be transferred to the device 600 using any number of well-known mechanisms. The device 600 includes or is coupled to a display 620. In the example of FIG. 1B, an image 114 of the object 104 captured under the first illuminant 102 is being displayed on the display 620 under a second illuminant 116, which may also be referred to as the destination illuminant. That is, the image data 108 was captured under a first illuminant 102, but an image 114 rendered from that data is being viewed under ambient lighting conditions (under the second illuminant 116) that may be different than the lighting conditions under which the image data was captured. Specifically, for example, the color of the second illuminant 116 may be different from the color of the first illuminant 102. Other aspects of the lighting conditions under which the image 114 is to be viewed may be different from the lighting conditions under which the image data 108 was captured. For example, the brightness of the second illuminant 116 may be different from (more bright or less bright than) the brightness of the first illuminant 102.

In embodiments according to the invention, the image data 108 is adjusted according to, for example, the color of the ambient light (the second illuminant 116) to generate second image data 112 that compensates for the color of the ambient light. The image 114 displayed on the display 620 is based on the second image data 112.

The processing of the first image data 108 to generate the second image data 112 can be performed dynamically on the device 600, for example, so that image quality is maintained when ambient lighting conditions change (either because the lighting conditions change over time or because the display 620 is being moved among different locations that have different lighting conditions).

In an embodiment, the color of the ambient light is sensed with a sensor 621 coupled to the display 620. The sensor may be a camera. That sensor, or a second sensor, can be used to also sense the brightness of the ambient light 116 (or some other characteristic of the ambient light), in which case the image data 108 can also be adjusted according to that brightness (or other characteristic).

Figure 2A:
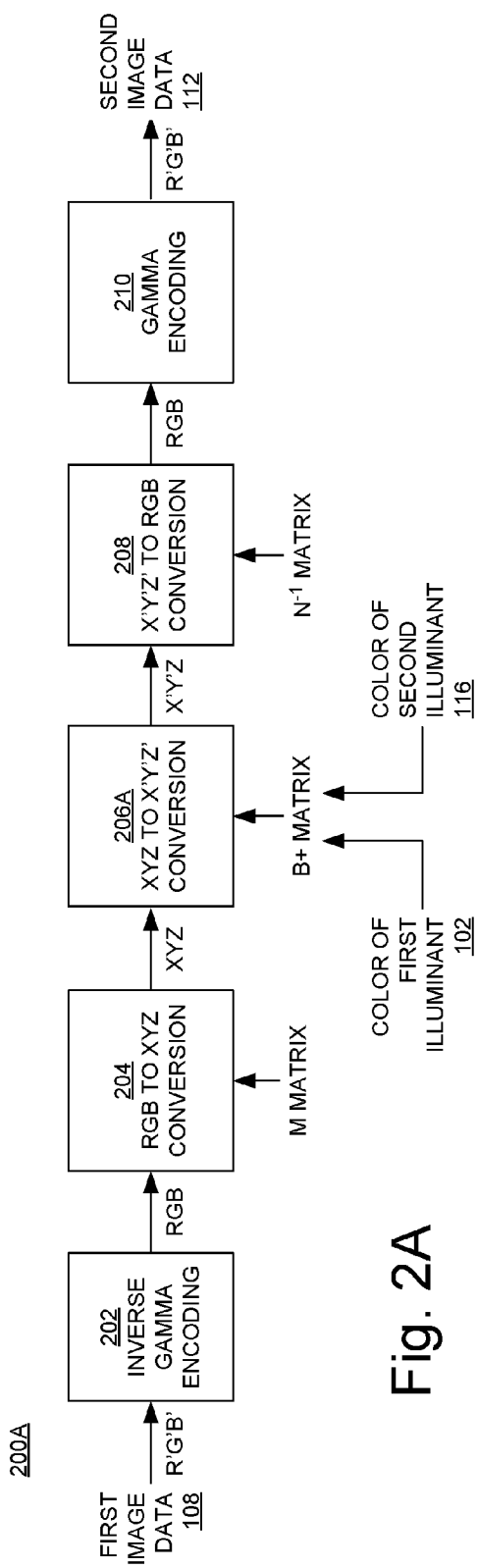
FIG. 2A is a block diagram illustrating an example of a process for adjusting image data according to ambient light conditions in an embodiment according to the present invention.

FIG. 2A is a block diagram showing stages in a process 200A for generating the second image data 112 from the first image data 108 in an embodiment according to the present invention. The process 200A can be performed by the device 600 of FIG. 1B.

In block 202 of FIG. 2A, the first (e.g., original) image data 108 is accessed or received. The image data 108 may be stored in memory of the device 600, or it may be received from the camera 106 of FIG. 1B. The image data 108 includes a set of color (e.g., red, green, and blue) values (R', G', B') for each pixel in the image data. The set of values (R', G', B') are in non-linear RGB space in the gamma domain.

In block 202 of FIG. 2A, inverse gamma encoding is performed to transform the each set of values (R', G', B') from non-linear space into a respective set of values (R, G, B) in linear space. This step is performed because subsequent matrix operations are defined in the linear space. The transformation from non-linear space to linear space is an exponentiation operation. In an embodiment, inverse gamma encoding uses the following equations to convert the non-linear R'G'B' image data into linear RGB image data:

for R',G',B'<0.018 and gamma ($\gamma$)=0.45:
R=R'/4.5;
G=G'/4.5;
B=B'/4.5; and
for R',G',B'≥0.018 and $\gamma$=0.45:
R=$[(R'+0.099)/1.099]^{-0.45}$;
G=$[(G'+0.099)/1.099]^{-0.45}$; and
B=$[(B'+0.099)/1.099]^{-0.45}$.

Figure 3:
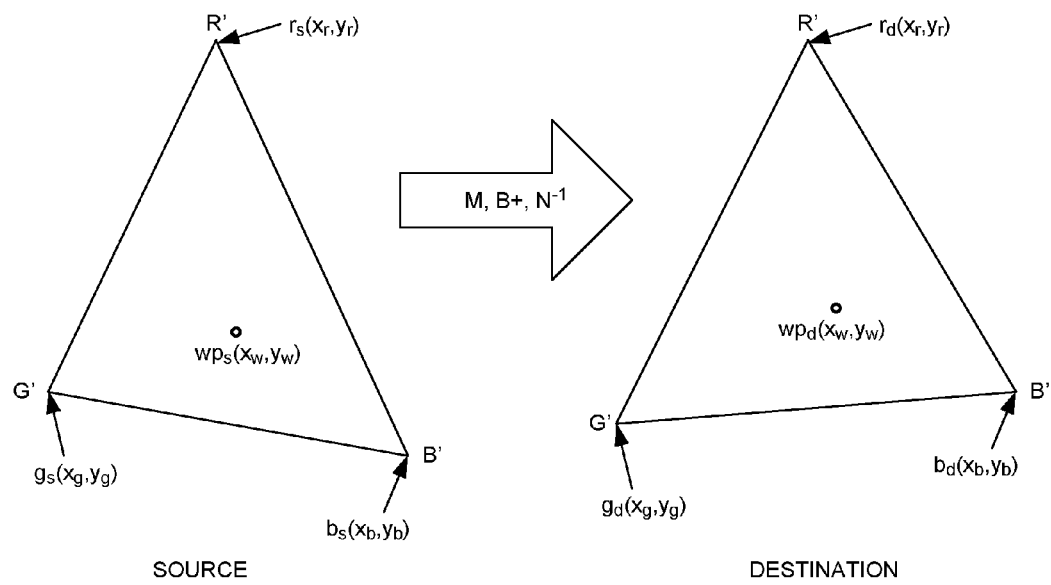
FIG. 3 illustrates color mapping from source to destination in an embodiment according to the present invention.

In block 204, each set of RGB values (still in linear space) is converted into a respective set of device-independent XYZ values using a three-by-three (3×3) matrix referred to herein as an M matrix. With reference to FIG. 3, the M matrix is based on the color space characteristics and whitepoint of the source, specifically the source chromaticity coordinates $r_s(x_r,y_r)$, $g_s(x_g,y_g)$, and $b_s(x_b,y_b)$ and the whitepoint coordinate $wp_s(x_{wp},y_{wp})$.

In block 206A of FIG. 2A, each set of device-independent XYZ values (still in linear space) is transformed into a respective set of transformed device-independent X'Y'Z' values using a 3×3 matrix referred to herein as a B+ matrix. The transformed device-independent X'Y'Z' values may be referred to herein as adjusted image data. The B+ matrix is derived from the color of the source illuminant (the first illuminant 102) and the color of the destination illuminant (the second illuminant 116) (the color of ambient light at the display 620 as detected by the sensor 621).

Conventionally, chromatic adaptation is performed using a Bradford transform referred to as a B matrix. A conventional B matrix can be used to transform image data based on a source illuminant and a desired destination illuminant. A B matrix can be calculated based on a source illuminant of, for example, D65 (the International Commission on Illumination (CIE) standard illuminant D65) and a desired destination illuminant that is, for example, red or reddish. In contrast to the conventional B matrix, in addition to or instead of transforming the image data based on the desired destination illuminant, the B+ matrix can be used to transform the image data (specifically, the sets of device-independent XYZ values) according to the ambient light conditions under which the image is to be viewed (e.g., the actual color of the destination illuminant).

In block 208, each set of X'Y'Z' values (still in linear space) is converted into a respective set of device-dependent RGB values using a 3×3 matrix referred to herein as an $N^{-1}$ matrix. With reference to FIG. 3, the $N^{-1}$ matrix is based on the color space characteristics and whitepoint of the destination, specifically the destination chromaticity coordinates $r_d(x_r,y_r)$, $g_d(x_g,y_g)$, and $b_d(x_b,y_b)$ and the whitepoint coordinate $wp_d(x_{wp},y_{wp})$.

In block 210 of FIG. 2A, gamma encoding is performed to transform each set of device-dependent RGB values from linear space into a respective set of R'G'B' values in non-linear space. The transformation from linear to non-linear space is an exponentiation operation. In an embodiment, gamma encoding uses the following equations to convert the linear RGB image data into the non-linear R'G'B' image data (the second data 112):

for R,G,B<0.018 and $\gamma$=0.45:
R=4.5*R';
G=4.5*G';
B=4.5*B'; and
for R,G,B≥0.018 and $\gamma$=0.45:
R=$1.099*(R')^{0.45}-0.099$;
G=$1.099*(G')^{0.45}-0.099$; and
B=$1.099*(B')^{0.45}-0.099$.

The process 200A can be represented as (not including inverse gamma encoding and gamma encoding):

$[RGB_{in}] \rightarrow [M] \rightarrow [XYZ] \rightarrow [B+] \rightarrow [X'Y'Z'] \rightarrow [N]^{-1} \rightarrow [RGB_{out}]$; or $[RGB_{out}] = [N]^{-1} \times [B+] \times [M] \times [RGB_{in}]$.

Thus, the color of the ambient light (the second illuminant 116) under which an image is to be viewed can be detected automatically by the sensor 621 (FIG. 1B), the B+ matrix can be derived based on the color of the ambient light and also considering the color of the first illuminant 102 under which the image was captured, and the B+ matrix can be applied to the inverse-gamma-encoded (linear) and device-independent XYZ values to ultimately produce the second image data 112 that, when rendered for display under the second illuminant (ambient light), compensates for the color of the second illuminant. Consequently, the desired color perception of the image rendered on the display 620 (FIG. 1B) is retained as the display is moved from one location to another with different light conditions or as the lighting conditions in a location change over time, and the quality of the rendered image is improved. The sensor 621, or another sensor, can be used to detect the brightness of the ambient light under which the image is to be viewed, and the contrast/brightness of the rendered image can be adjusted as well to further improve image quality.

Figure 2B:
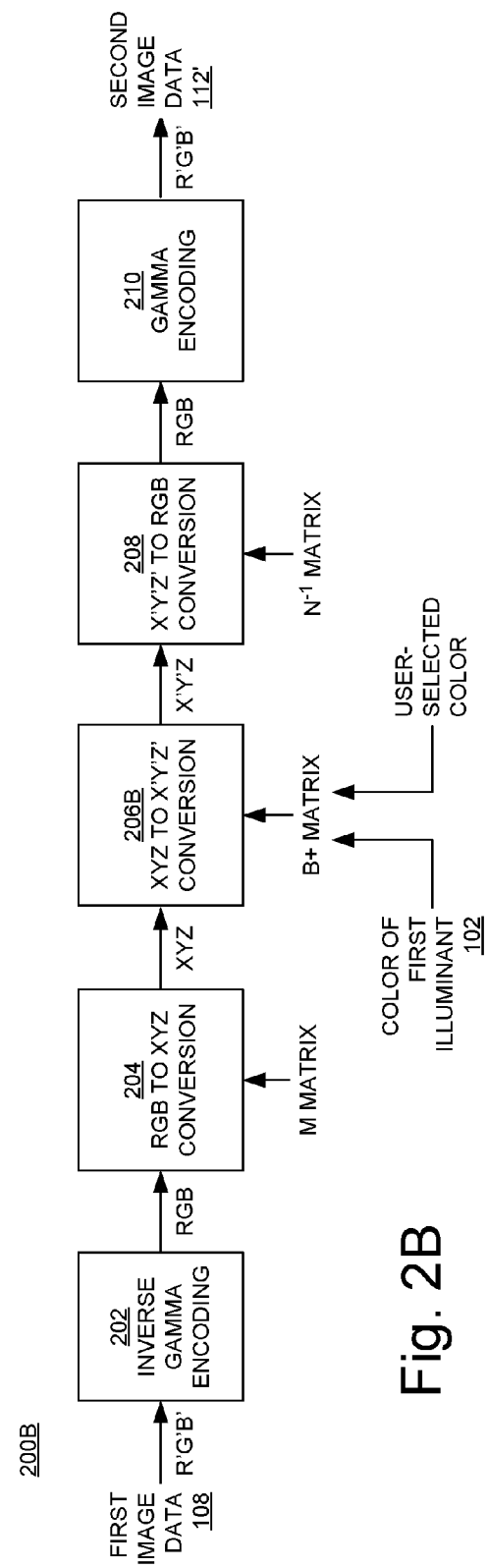
FIG. 2B is a block diagram illustrating an example of a process for adjusting image data according to a user-selected color of light in an embodiment according to the present invention.

FIG. 2B is a block diagram showing stages in a process 200B for generating second image data 112' from the first image data 108 in another embodiment according to the present invention. In process 200B, the blocks 202, 204, 208, and 210 are as described above. In contrast to process 200A, in block 206B of process 200B, the B+ matrix is derived from the color of the source illuminant (the first illuminant 102) and a second color selected by a user, and that B+ matrix is used to transform each set of device-independent XYZ values. In other words, the user in effect selects the color of the second illuminant 116. In this manner, the user can change the image to be displayed based on his or her tastes or for artistic reasons, for example. Note that the image data 112' that is output from process 200B can be stored, and that stored image data can be input to the process 200A in place of the image data 108, so that the adjusted image data 112' can be further adjusted to compensate for the color of the ambient light under which an image based on the adjusted image data 112' is to be viewed.

With reference to FIGS. 1A, 1B, 2A, and 2B, the processes 200A and 200B just described can be applied across the entire image 114 or only to portions of the image. For example, the processes can be applied to a color (range of colors) in the image 114 but not to other colors in the image. For instance, pixels of the image that are blue, or regions of the image 114 that are blue, can be adjusted as described above, while other pixels or regions are not adjusted. As another example, the colors of certain objects in the image 114 can be adjusted. For instance, trees in the image 114 can be identified and the colors of the trees can be adjusted, while the colors of other objects in the image are not adjusted.

Figure 4:
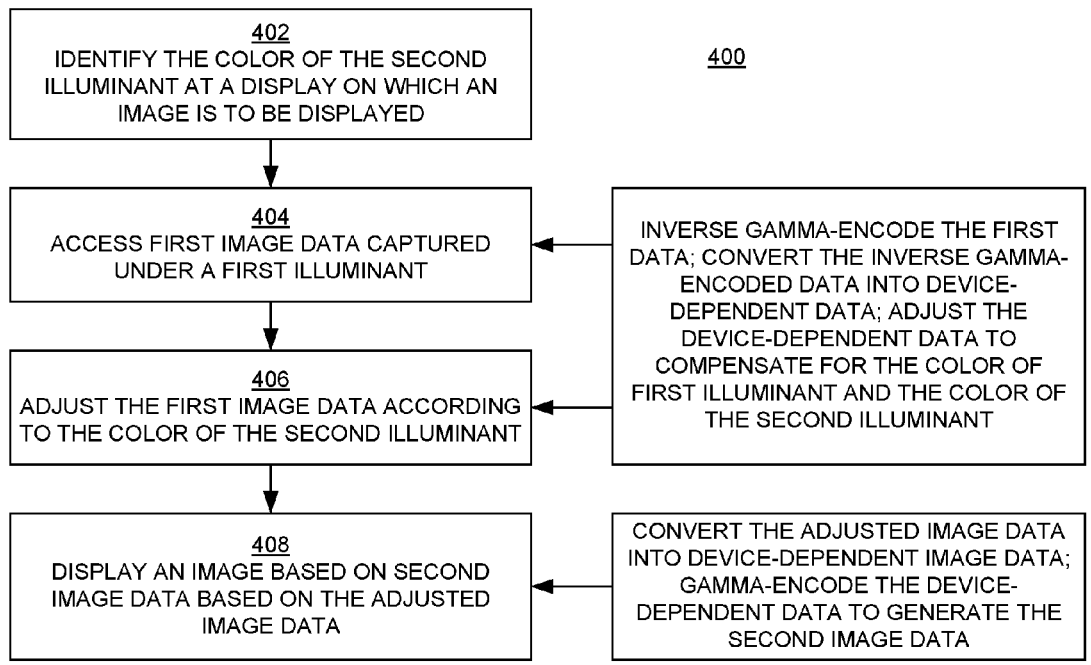
FIG. 4 is a flowchart illustrating an example of operations performed in a computer-implemented process for adjusting image data according to ambient light conditions in an embodiment according to the present invention.

FIG. 4 is a flowchart 400 of an example of a computer-implemented method for image processing in an embodiment according to the present disclosure. The flowchart 400 can be implemented as computer-executable instructions residing on some form of computer-readable storage medium (e.g., using the device 600 of FIG. 6).

In block 402 of FIG. 4 and with reference also to FIGS. 1A and 1B, a color of a second illuminant 116 (destination illuminant) is identified at a display (e.g., the display 620) on which an image 114 of an object 104 is to be viewed. In an embodiment, the color of the second illuminant 116 is the color of the ambient light at the display 620. In such an embodiment, the color of the ambient light can be determined using a sensor that is mounted on or is coupled to the display (e.g., the sensor 621). In another embodiment, the color of the second illuminant is a color selected by a user.

In block 404 of FIG. 4, with reference also to FIGS. 1A and 1B, first image data 108 for the image is accessed. The first image data 108 was captured with the object under a first illuminant 102 (source illuminant).

In block 406 of FIG. 4, with reference also to FIGS. 1A and 1B, the first image data 108 is adjusted according to the color of the second illuminant 116. The adjusted image data is used to generate second image data 112 that, when displayed, compensates for the color of the second illuminant.

In an embodiment, with reference also to FIG. 2A, the first image data 108 is gamma-domain non-linear image data, which is inverse-gamma-encoded to produce inverse-gamma-domain linear image data (block 202). The inverse-gamma-domain linear image data is converted into device-independent version image data (block 204). The device-independent image data is adjusted to compensate for the color of the first illuminant 102 and to compensate for the color of the second illuminant 116 to produce the adjusted image data (block 206).

In block 408 of FIG. 4, the image 114 that is based on the second image data 112 (which is based on the adjusted image data as described above) is displayed. In an embodiment, with reference also to FIG. 2A, the adjusted image data is converted into device-dependent image data (block 208), and the device-dependent image data is gamma-encoded to generate the second image data 112 (block 210).

Figure 5:
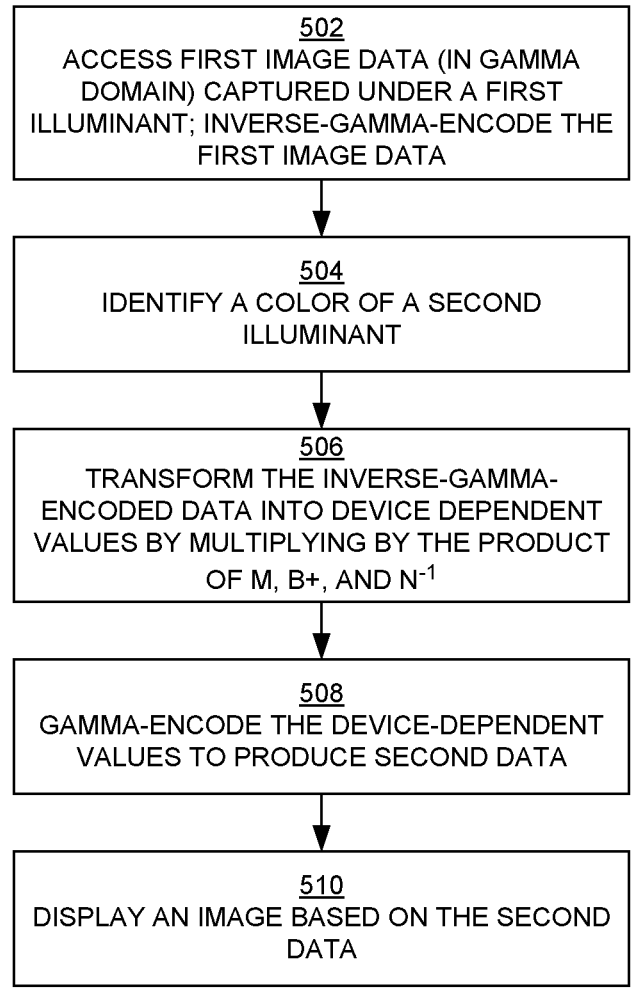
FIG. 5 is a flowchart illustrating an example of operations performed in a computer-implemented process for adjusting image data according to ambient light conditions in another embodiment according to the present invention.

FIG. 5 is a flowchart 500 of an example of a computer-implemented method for image processing in an embodiment according to the present disclosure. The flowchart 500 can be implemented as computer-executable instructions residing on some form of computer-readable storage medium (e.g., using the device 600 of FIG. 6).

In block 502 of FIG. 5, with reference to FIGS. 1A and 1B, gamma-domain image data (the first image data 108) for an image of an object illuminated by the color of a first illuminant 102 is accessed. The image data 108 includes color values (e.g., R'G'B' values). The image data 108 is then inverse-gamma-encoded.

In block 504, a color of a second illuminant 116 at a display device 620 (FIG. 6) is identified.

In block 506 of FIG. 5, with reference also to FIGS. 2A and 2B, the inverse-gamma-encoded color values (RGB) are transformed by multiplying those color values by a product of: first values (the M matrix) that transform the color values into device-independent color values (XYZ), second values (the B+ matrix) that transform the device-independent color values to compensate for the color of the first illuminant 102 and the color of the second illuminant 116 (or the user-selected color) to produce adjusted color values (X'Y'Z'), and third values (the $N^{-1}$ matrix) that transform the adjusted color values into device-dependent color values (RGB).

In block 508, the device-dependent color values are gamma-encoded to produce second data 112.

In block 510, an image based on the device-dependent color values (the second data 112) is displayed on the display device 620 (FIG. 6).

FIG. 6 is a block diagram of an example of a device 600 upon which embodiments according to the present invention can be implemented. The device 600 broadly represents any single or multi-processor computing device or system capable of executing computer-readable instructions. Here, the device 600 is, but is not limited to, a laptop, tablet, or handheld computer, a cell phone, or a smart phone. The device 600 may be powered by a battery and/or by being plugged into an electrical outlet. Depending on the implementation, the device 600 may not include all of the elements shown in FIG. 6, and/or it may include elements in addition to those shown in FIG. 6. In the example of FIG. 6, the device 600 includes a display device 620.

In its most basic configuration, the device 600 includes at least one processor 602 (CPU) and at least one memory 604. The processor 602 generally represents any type or form of processing unit capable of processing data or interpreting and executing instructions. In certain embodiments, the processor 602 may receive instructions from a software application or module. These instructions may cause the processor 602 to perform the functions of one or more of the example embodiments described and/or illustrated herein.

The memory 604 generally represents any type or form of volatile or non-volatile storage device or medium capable of storing data and/or other computer-readable instructions. In certain embodiments the computing system 600 may include both a volatile memory unit (such as, for example, the memory 604) and a non-volatile storage device (not shown).

The communication interface 622 broadly represents any type or form of communication device or devices capable of facilitating communication (wired or wireless) between the device 600 and one or more additional devices. For example, the communication interface 622 can be used to connect with the camera 106 of FIG. 1B. Alternatively, the device 600 may include a camera (not shown in FIG. 6).

The device 600 also includes an input device 608 that is operatively coupled to the processor 602. The input device 608 may include a touch sensing device (a touch screen) configured to receive input from a user's touch and to send this information to the processor 602. The processor 602 interprets the touches in accordance with its programming.

An input device 608 may be integrated with the display device 620 or they may be separate components. In the illustrated embodiment, the input device 608 is a touch screen that is positioned over or in front of the display device 606. The input device 608 and display device 620 may be collectively referred to herein as a touch screen display 607.

As illustrated in FIG. 6, the device 600 may also include at least one input/output (I/O) device or user interface 610. The I/O device 610 generally represents any type or form of input device capable of providing/receiving input or output, either computer- or human-generated, to/from the device 600. Examples of an I/O device 610 include, without limitation, a keyboard (including a virtual keyboard displayed on the input device 608), a pointing or cursor control device (e.g., a mouse), a speech recognition device, or any other input device.

In an embodiment, the device 600 includes a sensor 621 that can be used to sense ambient light conditions at the location of the device 600 (the color of the second illuminant 116 of FIG. 1B). In an embodiment, the sensor 621 also senses other characteristics of the ambient light, such as its brightness. In another embodiment, a second sensor 623 is used to sense other characteristics of the ambient light, such as its brightness.

Many other devices or subsystems may be connected to the device 600. Conversely, all of the components and devices illustrated in FIG. 6 need not be present to practice the embodiments described herein.

A computer-readable medium containing a computer program for implementing the operations described herein (e.g., operations included in the flowcharts 400 and 500 of FIGS. 4 and 5) may be loaded into the device 600. All or a portion of the computer program stored on the computer-readable medium may then be stored in the memory 604. When executed by the processor 602, a computer program loaded into the device 600 may cause the processor 602 to perform and/or be a means for performing the functions of the example embodiments described and/or illustrated herein.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems (e.g., the device 600), one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in the device 600. These software modules may configure the device 600 to perform one or more of the example embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method of image processing, the method comprising:
   identifying a color of a second illuminant at a device;
   accessing a device-independent version of first image data for a first image of an object, the first image data captured with the object under a first illuminant, wherein the device-independent version of the first image data is determined by applying first factors to an inverse-gamma-encoded version of gamma domain non-linear image data, wherein the first factors are based on color space characteristics and whitepoint of the first illuminant;
   generating adjusted image data from the device-independent version of the first image data by applying second factors to the device-independent version of the first image data, wherein the second factors are derived using both a color of the first illuminant and the color of the second illuminant; and
   displaying on the device a second image of the object rendered from second image data that is based on the adjusted image data.

2. The method of claim 1, wherein said identifying the color of the second illuminant comprises sensing, with a sensor coupled to the device, the color of ambient light at the device.

3. The method of claim 2, wherein said generating is performed automatically in response to said sensing.

4. The method of claim 1, wherein said identifying the color of the second illuminant comprises receiving a user input that selects the color of the second illuminant.

5. The method of claim 1, further comprising sensing a brightness of ambient light at the device, wherein the brightness of the ambient light is compensated for in the second image data.

6. The method of claim 1, wherein said displaying comprises:
converting the adjusted image data into device-dependent image data; and
gamma-encoding the device-dependent image data, to generate the second image data.

7. A device, comprising:
a processor;
a display screen coupled to the processor; and
memory coupled to the processor, the memory having stored therein instructions that, when executed, cause the device to perform a method of processing an image comprising an object, the method comprising:
identifying a color of a second illuminant at the display screen;
accessing a device-independent version of first image data for a first image of the object, the first image data captured with the object under a first illuminant different from the second illuminant, wherein the first image data comprises color values for the object, wherein the device-independent version of the first image data is determined by applying first factors to an inverse-gamma-encoded version of gamma domain non-linear image data, wherein the first factors are based on color space characteristics and whitepoint of the first illuminant;
generating adjusted image data from the device-independent version of the first image data by applying second factors to the device-independent version of the first image data, wherein the second factors are derived using both a color of the first illuminant and the color of the second illuminant, and wherein the adjusted image data compensates the color values for the object according to both the color of the first illuminant and the color of the second illuminant; and
generating second image data of the object from the adjusted image data, wherein the second image data, when rendered, produces on the display screen a second image comprising the object.

8. The device of claim 7, further comprising a sensor coupled to the processor and operable for sensing the color of the second illuminant at the device.

9. The device of claim 8, wherein the sensor is further operable for sensing a brightness of ambient light at the device, wherein the brightness of the ambient light is compensated for in the second image data.

10. The device of claim 8, wherein the sensor comprises a camera.

11. The device of claim 8, further comprising a second sensor coupled to the processor and operable for sensing a brightness of ambient light at the device, wherein the brightness of the ambient light is compensated for in the second image data.

12. The device of claim 7, further comprising a user interface coupled to the processor and operable for receiving an input that selects the color of the second illuminant.

13. The device of claim 7, wherein the method further comprises:
converting the adjusted image data into device-dependent image data; and
gamma-encoding the device-dependent image data, to generate the second image data.

14. A method of image processing, the method comprising:
accessing first image data for an image of an object illuminated by a color of a first illuminant, the first image data comprising color values;
identifying a color of a second illuminant at a display device;
transforming the color values by multiplying the color values by a product of first values, second values, and third values, wherein the first values transform the color values into device-independent color values, wherein the first values are based on color space characteristics and whitepoint of the first illuminant, wherein the device-independent color values are inverse-gamma-encoded versions of gamma domain non-linear color values, the second values are derived using both the color of the first illuminant and the color of the second illuminant and transform the device-independent color values to compensate for both the color of the first illuminant and the color of the second illuminant to produce adjusted color values, and the third values transform the adjusted color values into device-dependent color values;
gamma-encoding the device-dependent color values; and
displaying on the display device an image based on second image data comprising the device-dependent color values.

15. The method of claim 14, wherein said identifying the color of the second illuminant comprises sensing, with a sensor coupled to the display device, the color of the second illuminant at the display device.

16. The method of claim 14, wherein said identifying the color of the second illuminant comprises receiving a user input that selects the color of the second illuminant.

17. The method of claim 14, further comprising:
sensing a brightness of ambient light at the display device; and
adjusting the image displayed on the display device according to the brightness of the ambient light.

* * * * *